United States Patent
Oberdorfer, Jr.

[15] 3,685,502
[45] Aug. 22, 1972

[54] MOTOR VEHICLE EMISSION CONTROL SYSTEM

[72] Inventor: Paul E. Oberdorfer, Jr., Wilmington, Del.

[73] Assignee: Sun Oil Company, Philadelphia, Pa.

[22] Filed: March 4, 1971

[21] Appl. No.: 121,195

[63] Continuation of Ser. No. 28,320, Apr. 14, 1970, abandoned.

[52] U.S. Cl. ..........123/119 R, 123/119 DA, 60/272, 60/274, 60/282, 60/299
[51] Int. Cl..........F02n 23/00, F01n 3/08, F01n 7/16
[58] Field of Search.....60/30, 29; 123/119 R, 119 A, 123/119 D, 119 DA

[56] References Cited

UNITED STATES PATENTS

| 3,236,344 | 2/1966 | Wawrzinick et al. | 60/29 |
| 3,247,666 | 4/1966 | Behrens | 60/30 |
| 3,287,899 | 11/1966 | Bintz | 60/29 UX |
| 3,302,394 | 2/1967 | Pahnke et al. | 60/30 |
| 3,392,523 | 7/1968 | Hyde et al. | 60/30 |
| 3,486,326 | 12/1969 | Hermes et al. | 60/29 |
| 3,500,807 | 3/1970 | Daigh | 60/30 UX |
| 3,505,028 | 4/1970 | Douthit | 60/30 UX |
| 3,413,803 | 12/1968 | Rosenlund et al. | 60/30 X |

OTHER PUBLICATIONS

Society of Automotive Engineers, Inc. Publication No. 700147 Jan. 12–16, 1970 New York, N.Y.

*Primary Examiner*—Wendell E. Burns
*Attorney*—George L. Church, Donald R. Johnson and Frank A. Rechif

[57] ABSTRACT

Emission from motor vehicle exhausts of oxides of nitrogen, carbon monoxide, hydrocarbons, and aldehydes is reduced by a combination of selective enrichment of the fuel-air mixture fed by the carburetor to the engine, and an exhaust converter, e.g., a thermal exhaust reactor. The selective enrichment is carried out under low speed, mild acceleration (urban) driving conditions.

5 Claims, 2 Drawing Figures

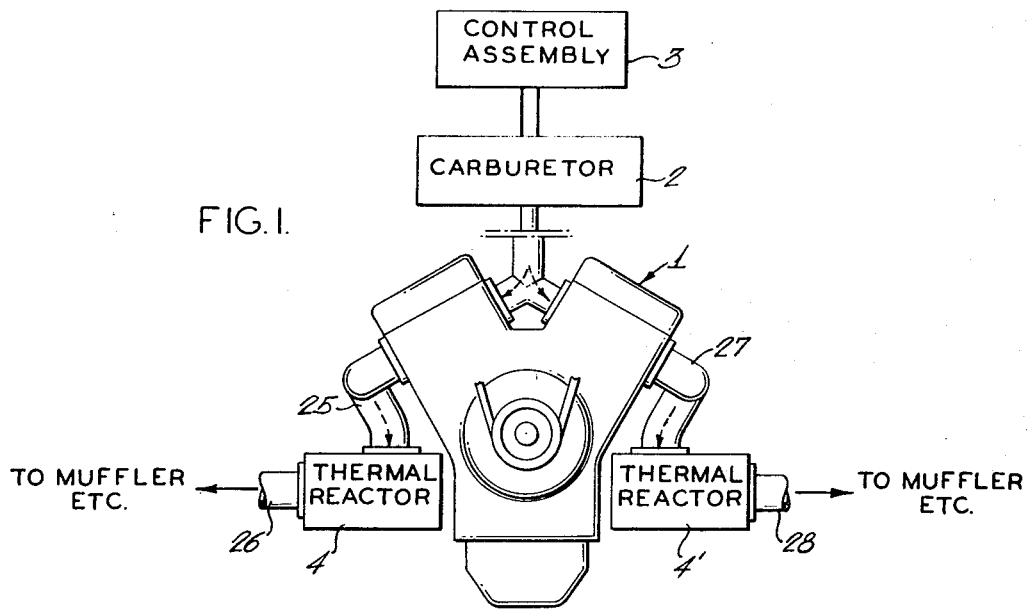
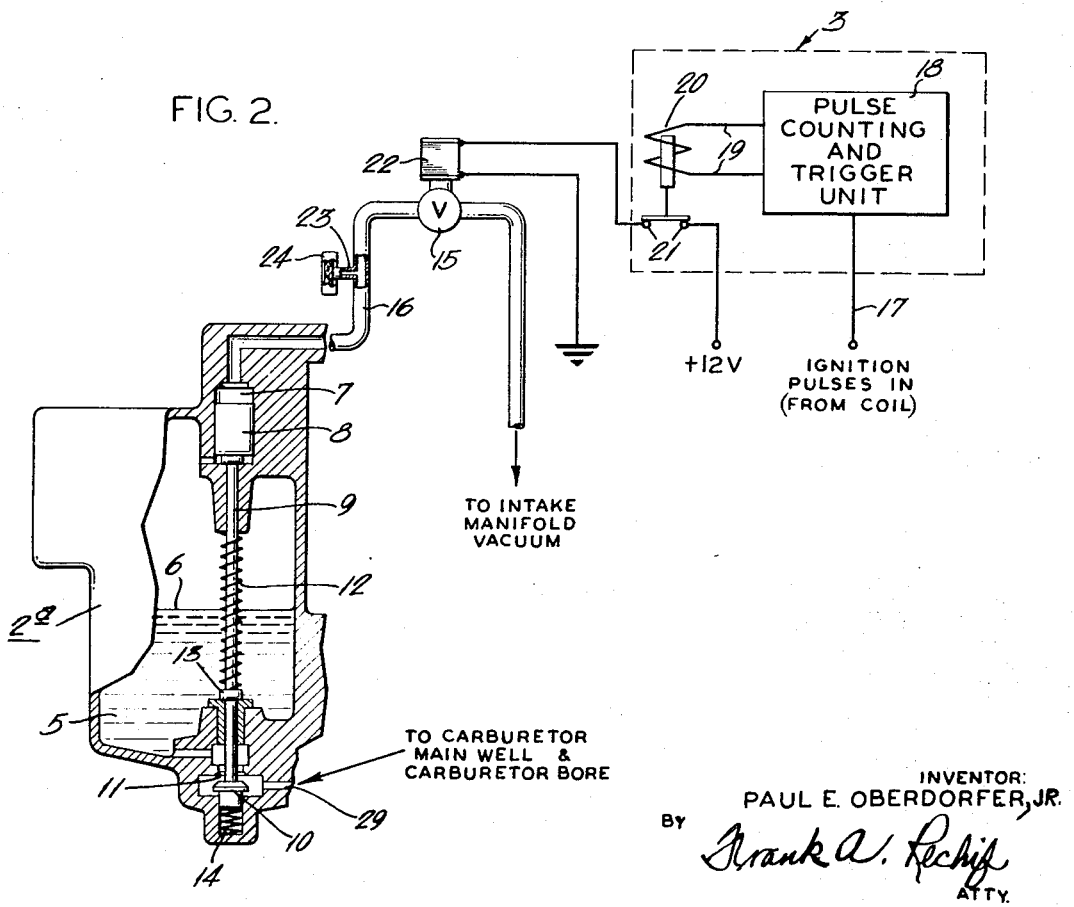

MOTOR VEHICLE EMISSION CONTROL SYSTEM

This application is a continuation of my copending but now abandoned application Ser. No. 28,320, filed Apr. 14, 1970, which in turn was a continuation-in-part of abandoned application Ser. No. 889,252, filed Dec. 30, 1969.

This invention relates to controlling emissions from the exhausts of motor vehicles driven by gasoline-fueled internal combustion engines, and more particularly to controlling these emissions in such a way as to reduce certain air pollutants (e.g., smog-forming pollutants) commonly present in motor vehicle exhaust gases.

It has been recognized that certain types of atmospheric pollutants or contaminants are commonly present in exhaust emissions from motor vehicles, and should be reduced; in fact, certain Federal standards have been set for exhaust emissions of hydrocarbons (currently not more than 2.2 grams per vehicle mile) and carbon monoxide (not more than 23 grams per vehicle mile). In addition, standards for oxides of nitrogen ($NO_x$) are now under active consideration. Also, it is desirable to reduce exhaust emissions of aldehydes, although no targets or standards have yet been specified for these.

Previously, a rather common approach to the problem of total emission control (at least, the control of carbon monoxide, hydrocarbons, and $NO_x$) has been to employ a catalytic converter or catalytic muffler for the reduction of the emission of carbon monoxide and hydrocarbons, and to recirculate a portion of the exhaust gas back through the engine in order to reduce the $NO_x$ emission. However, the recirculation of exhaust gas adversely affects the vehicle performance, or driveability. In addition, the catalytic device calls for a rather complicated arrangement for switching or bypassing of the exhaust (in order to prevent burnout of the catalyst at higher speeds). Moreover, a very serious problem of catalyst poisoning arises when using leaded fuels. However, it will be realized that, because of the current definite trend toward increased production of non-leaded fuels, this last-mentioned problem (catalyst poisoning) may in time disappear.

An object of this invention is to provide a novel motor vehicle emission control system.

Another object is to provide a system for automotive exhaust emission control which is substantially simpler than systems previously proposed.

Another object is to provide a low exhaust emission system for motor vehicles which eliminates the drawbacks associated with the system previously described.

A further object is to provide an emission control system for automobiles which does not adversely affect the driveability of the automobile.

An additional object is to provide a motor vehicle emission control system which preferably does not employ any catalyst, and which is not required to recirculate troublesome exhaust gases.

A still further object is to provide an automotive emission control system which gives results showing substantial improvement over factory-equipped automobiles, and approaching the levels deemed necessary for improved urban air quality in the years ahead.

The objects of this invention are accomplished, briefly, in the following manner: In the internal combustion engine of a motor vehicle which utilizes full-boiling gasoline as a fuel, a highly selective carburetor enrichment induction system (which enriches the fuel-air mixture fed to the engine under ubran driving conditions) is used in conjunction with or in combination with one or more exhaust converters. The enrichment of the mixture suppresses formation of $NO_x$ and also reduces the emission of aldehydes, while the downstream converters remove hydrocarbons and carbon monoxide from the exhaust by conversion thereof to harmless substances.

A detailed description of the invention follows, taken in conjunction with the accompanying drawing, wherein:

FIG. 1 is a diagrammatic illustration showing the principal elements of a motor vehicle emission control system (exhaust pollutant reduction system) according to this invention; and FIG. 2 is a schematic illustration of a selective carburetor control arrangement which may be utilized in the invention.

Refer first to FIG. 1. A V-type or V-design internal combustion engine, which uses full-boiling gasoline (a so-called fossil fuel, or a hydrocarbon fuel) as a fuel, is quite schematically represented by numeral 1. A curburetor 2, of somewhat conventional construction but modified as hereinafter described (to achieve a selective enrichment action), supplies a fuel-air mixture to the two cylinder banks of engine 1. The selective enrichment action of the carburetor 2 is effected by means of a control assembly 3, hereinafter described.

An exhaust converter, preferably a thermal reactor 4 of the type described more fully hereinafter, is mounted in the engine compartment of the motor vehicle (e.g., automobile) to receive the effluent (exhaust) from one bank of cylinders, and a duplicate unit 4', also mounted in the engine compartment, receives the effluent from the other cylinder bank. The outlet connections of the two converters 4 and 4' are connected to the conventional exhaust system of the automobile, including a muffler or mufflers, tailpipes, etc.

Basically, one of the two parts or portions of the total motor vehicle emission control system of this invention involves the lessening of the formation of $NO_x$ (also aldehydes) in the combustion chambers of the engine. The reduction in $NO_x$ is brought about through enrichment (to the vicinity of 12.0 to 13.0 air-fuel ratios) of the air-fuel mixture fed to the intake of the engine. A selective enrichment of the air-fuel mixture is utilized, since the maximum amount of $NO_x$ is generated under certain conditions of operation, and since fuel economy would suffer very badly if blanket enrichment (that is, enrichment throughout all driving conditions) were used. Specifically, enrichment is used under the conditions of part throttle acceleration (mild acceleration) driving and low speed cruise (low engine speed) driving. These last-mentioned driving conditions are the critical or key modes of "city driving" which ordinarily contribute most of the $NO_x$ to the urban atmosphere.

As previously stated, a highly selective enrichment of the fuel-air mixture fed by the carburetor to the engine (that is to say, a highly selective carburetor enrichment) effects a lessening of the formation of $NO_x$ in the combustion chambers of the engine 1. Also, the enrichment of the fuel-air mixture brings about a reduction in the emission of aldehydes from the engine. The desired highly selective carburetor enrichment action can be obtained by a modification or reworking of a conventional carburetor. Refer now to FIG. 2. A portion of the outer housing of carburetor 2 is diagrammatically illustrated at 2a. This portion 2a of the housing is in communication with the carburetor bowl, so that liquid fuel (gasoline) 5 is present in this housing portion, up to a certain level 6; above this liquid level, there is atmospheric air pressure.

Substantially all American automobile carburetors include a power (enrichment) system, or a power jet system, for supplying additional fuel to the carburetor main well area (in the main metering system of the carburetor, leading to the carburetor bore) under high speed and/or heavy load conditions. This power jet arrangement, together with its conventional operation, will next be described.

A power piston vacuum chamber 7, to which the intake manifold vacuum of the engine is supplied at certain times and under certain engine operating conditions, is provided above housing portion 2a, and a piston 8 operates within this chamber. The lower face of piston 8 is subjected to the atmospheric pressure within housing portion 2a, while the upper face of this piston is adapted to be subjected to the engine manifold vacuum. The upper end of a piston rod 9 is secured to the lower face of piston 8, and the lower end of rod 9 is adapted to come into engagement with, and to thereby actuate, a power valve 10 which seats when closed against a valve seat 11 provided in the bottom region of housing portion 2a. The piston 8 and piston rod 9 are spring loaded by means of a helical spring 12 surrounding rod 9, the upper end of this spring bearing against the fixed housing 2a and the lower end of this spring bearing against a collar 13 secured to or integral with rod 9; the calibrated spring 12 normally biases the piston and rod downwardly, into engagement with the upper end of the stem of power valve 10.

The power valve 10 is biased upwardly to its closed position (against its seat 11) by means of a spring 14 associated with the stem of this valve. When the power valve 10 is actuated to its open position, away from its seat 11, a power jet is created, and fuel 5 can flow from the body portion 2a through the opened seat 11 and through a passage 29, acting as a power restriction, to the main well of the carburetor (not shown) and thence into the carburetor bore (also not shown). This increased or extra fuel flow into the main well of the carburetor produces an enrichment of the air-fuel mixture fed from the carburetor to the engine intake manifold.

Some carburetors employ a diaphragm-actuated power enrichment section (rather than the piston-actuated arrangement described previously). The same principles of operation apply to this last-mentioned type of carburetor. In fact, a carburetor of this last-mentioned type has actually been incorporated into an embodiment of this invention which was actually built and tested.

The ordinary or conventional operation of the power system will now be described. Assume that a solenoid-operated valve 15 in a line (tubing or hose) 16 extending from the intake manifold to the vacuum chamber 7 is open (how this valve is operated will be later described). When the power piston vacuum chamber 7 is thus open to manifold vacuum in the carburetor bore beneath the throttle valves, the vacuum in this chamber rises and falls with manifold vacuum.

During part throttle operation (above a certain vehicle speed, when valve 15 is open), manifold vacuum in chamber 7 is high. Therefore, air pressure (atmospheric pressure) beneath the piston 8 (the manifold vacuum being above this piston) holds this piston in the fully raised position, against the tension of spring 12. As the engine load or vehicle speed is increased, the throttle valves open wider and manifold vacuum drops. This means increased pressure in chamber 7; the calibrated spring 12 now forces the piston rod 9 down against the stem of power valve 10 to actuate this valve to open position (as illustrated in FIG. 2), allowing fuel to flow through the passage 29 into the carburetor main well.

When the load is decreased, the throttle valves close and manifold vacuum is increased. Therefore (assuming valve 15 is still open), air pressure below the piston 8 (the pressure above this piston decreasing) gradually overcomes the tension of spring 12 and forces the piston upward to its original position, with the lower end of rod 9 away from the stem of power valve 10; the power valve is then caused to fully close (by its own spring 14).

From the foregoing description, it will be appreciated that the presence of an appreciable vacuum in chamber 7 (valve 15 being open) normally causes the power system to remain inactive; at or near full throttle operation, the vacuum drops sufficiently to cause activation of the power jet.

According to this invention, the power valve or power jet arrangement of the carburetor is used to effect the highly selective enrichment which lessens the formation of $NO_x$ (and also aldehydes) in the engine cylinders. Pulses derived from the ignition coil of the engine, the repetition rate of which is of course directly proportional to the speed of the engine, are fed at 17 into the input of a pulse counting and trigger unit 18, which rectifies these pulses and applies them to an internal trigger circuit set to produce a signal voltage across the output leads 19 of unit 18 when the input pulse repetition rate corresponds to a predetermined engine speed, say that corresponding to approximately 35 mph vehicle speed, though not limited thereto.

The unit 18 is preferably a commercially-available tachometer-type solid-state circuit, such as the units which are often used in racing as over-speed indicators on engines. These units are responsive to engine speed and produce an output signal voltage when a certain engine speed is reached.

The output leads 19 are connected to the coil of a relay 20 having a pair of normally closed contacts 21 which when closed supply 12 volts (derived from the car battery) to a solenoid 22 which operates the valve 15 in the vacuum line 16 for supplying intake manifold vacuum to the piston chamber 7. The arrangement is such that when solenoid 22 is energized valve 15 is closed, removing the vacuum from chamber 7. It is here pointed out that elements 17–21 essentially make up the control assembly 3 of FIG. 1.

Below the present engine speed corresponding (by way of example) to approximately 35 mph vehicle speed, which latter may be thought of as the "trigger speed," there is no signal voltage on leads 19, relay 20 is unenergized, contacts 21 are closed and solenoid 22 is energized, which closes the valve 15, removing the vacuum from chamber 7. These conditions are the ones illustrated in FIG. 2. The removal of the vacuum from chamber 7 means that atmospheric pressure is supplied to chamber 7, which has the same effect as increased pressure in chamber 7. This interruption of the vacuum (which normally causes the power jet to remain inactive, except at full or near full throttle operation) causes piston rod 9 to move downwardly as shown in FIG. 2, actuating power valve 10 to open position to thereby turn "on" the power jet and cause enrichment of the fuel-air mixture supplied to the engine cylinders. As previously described, this enrichment lessens the formation of $NO_x$ in the engine cylinders, and also lessens the production of aldehydes.

Since enrichment of the fuel-air mixture is made to occur, as just described, under certain conditions (low speed, mild acceleration conditions, below approximately 35 mph), there is inherently some loss in fuel economy under these stop-and-go, city driving, conditions. In order to restore fuel economy at higher speed cruise conditions (highway conditions), where emissions are less of a problem, the enrichment action is made highly selective, which is to say that it is taken out of play at a vehicle speed of approximately 35 mph, or other preset speed as desired. This result is brought about in the following way. At or above the engine speed corresponding to the "trigger speed," the repetition rate of the ignition pulses fed into unit 18 becomes high enough to actuate the trigger circuit of this unit, causing a signal voltage to appear on leads 19. This energizes relay 20 to open its contacts 21, deenergizing solenoid 22 and opening valve 15 to reconnect the intake manifold vacuum to chamber 7. The re-application of the vacuum to chamber 7 causes piston rod 9 to move upwardly from the position illustrated in FIG. 2, releasing the power valve 10 and allowing it to close to turn "off" the power jet. This releans the air-fuel mixture, restoring fuel economy. Under these conditions, then (at these higher or highway speeds), the power jet can function in its normal manner, the vacuum causing the power jet to remain inactive except at full or near full throttle operation.

In order to permit nearly instantaneous switching of the chamber 7 from atmospheric to engine manifold pressure, and vice versa, an air bleed or vacuum leak is provided in line 16, between valve 15 and chamber 7. This is a small calibrated orifice 23 which opens line 16 to the atmosphere, through a filter 24 which prevents plugging of the orifice.

In some instances, it might be desirable to close the power jet at idle or near idle speed (say below 15 mph vehicle speed), or upon closed throttle deceleration, in order to further enhance fuel economy, and in view of the fact that at idle speed there is very little load on the engine and hence the power jet is not functioning efficiently, anyway. To do this, a switch would be mounted on the throttle in such a manner that it would be opened when the throttle reaches a position below that corresponding to 15 mph. This switch would be connected into the solenoid circuit in such a way that when the switch opens, the solenoid 22 would be deenergized, opening the valve 15 and thus applying the manifold vacuum to chamber 7; this would close the power valve 10 and the power jet. Thus, this application of the manifold vacuum to chamber 7 would cause the carburetor to revert to its "normal" condition, since manifold vacuum is high during very low load (closed or nearly closed throttle) operation; no enrichment of the mixture then takes place, maintaining fuel economy.

Refer again to FIG. 1. As previously stated, the emission control system of this invention includes a pair of exhaust converters (preferably thermal reactors) 4 and 4' for acting upon the carbon monoxide and hydrocarbons which appear in the effluent from the combustion chambers or cylinders of the engine. A thermal reactor 4 is connected to the four exhaust ports of one cylinder bank of the V-type engine 1, and an exactly similar thermal reactor 4' is connected to the four exhaust ports of the other cylinder bank of the engine. The thermal reactors 4 and 4' will not be described in detail herein, since per se they form no part of the present invention; by way of example, they may be of the construction disclosed in the Rosenlund-Douthit U.S. Pat. No. 3,413,803. The patented reactor is of a double (concentric) hollow tubular construction, with no catalyst; the outer tube has relatively thin layers of heat-insulating material on its inner faces. Each reactor has four inlet connections, one for each of the four cylinders of the corresponding cylinder bank, and a single outlet connection; these reactors may therefore be termed thermal exhaust manifold reactors. For reactor 4, one of the inlet connections is schematically indicated at 25 and the outlet connection is schematically indicated at 26; this latter connection extends to the muffler, etc. of the dual exhaust system of the automobile. For reactor 4', an inlet connection is schematically indicated at 27 and the outlet connection at 28; this latter connection extends to the muffler, etc. of the automobile's dual exhaust system.

Although not illustrated in the drawing, an air injection system (secondary air delivery system) is preferably used in conjunction with the thermal reactors 4 and 4'. This system utilizes an air delivery pump belt-driven from the engine and having a filter and silencer on its intake. Air from this pump is fed continuously, by means of individual delivery tubes and channels, to a point just underneath each exhaust valve, outside each combustion chamber or cylinder, so that it is introduced at each exhaust valve but just beyond the combustion chambers or cylinders, on the way to the reactors 4 and 4'.

As described in the above-identified patent, oxidation (i.e., combustion) of hydrocarbons and of carbon monoxide contained in the exhaust gases (effluent from the combustion chambers of the engine) takes place in the thermal reactors 4 and 4', the oxidation reaction being enhanced by various types of turbulence which are caused to occur in the reactors. In addition to the combustion of the carbon monoxide and hydrocarbons which takes place in the reactors, combustion or oxidation of aldehydes, which may be left over in the effluent from the combustion chambers of the engine, is postulated to also take place in the thermal reactors, since these aldehydes are combustible substances.

It may be noted here that the selective enrichment arrangement described in connection with FIG. 2 operates on the induction system or intake of the engine, while the thermal reactors operate on the exhaust of the engine. However, there is an important interaction or interplay between the two, as will now be explained. The complete overall system includes two combustion devices which must work in harmony, the first being the engine itself and the second being the thermal reactors. First, the carburetor is optimized (by selective enrichment) to reduce to a minimum the $NO_x$ (and also the aldehydes, which decrease with richer mixtures), in keeping with good engine performance, economy, and driveability, and then the secondary air delivery system (air in effect injected into the thermal reactors) must be tailored to give the proper air-fuel ratio to the reactors, such that these latter will (a) completely burn the carbon monoxide and hydrocarbons; (b) at the same time, not be burned up themselves.

By way of example, in order to minimize the $NO_x$ and the aldehydes in the combustion chamber (by way of carburetor enrichment) there might be 6 percent carbon monoxide produced (due in large part to the enrichment action, with more fuel going into the cylinders). This means that more carbon monoxide is being sent as fuel to the thermal reactors. Without more air, the reactors would not burn this properly due to either improper chemical balance or improper combustion temperatures. The ratio of CO to air fed to the reactors is critical since an optimum combustion temperature is desired for emissions reduction; at the same time, the combustion must be limited so that the temperature does not get so high that the reactors burn up. So, the amount of air that is injected into the inlet of the reactors (by means of the secondary air delivery system) must be readjusted to compensate for the action that has been effected in the carburetor to produce a certain amount of carbon monoxide and at the same time the amount of CO produced by enrichment (and thus the level of enrichment) must be carefully balanced.

As has been described previously, the selective carburetor enrichment (at low speeds) employed in this invention requires the supplying of additional air to the reactors (by means of the secondary air delivery system described), over and above what would be supplied to the reactors absent any enrichment, in order to properly oxidize or burn the carbon monoxide and hydrocarbons in the combustion chamber effluent. This means that when the solenoid 22 is deenergized and the carburetor power system returns to "normal," there is an excess-air condition which prevents the reactors 4 and 4' from overheating. That is, at higher speed conditions more air is supplied to the reactors than they need; they still function to reduce the hydrocarbons, carbon monoxide, and aldehydes to a low level, but the extra air prevents the reactor temperature from continuing to rise, thus relieving any tendency to burn out the reactors.

Because of the selective carburetor enrichment employed in the emission control system of this invention, the engine requires slightly more gasoline. That is to say, with this system there is an inherent reduction in fuel economy. On a city-suburban test route, it was found that there was a loss of about 10 percent in fuel economy (miles per gallon), though in highway driving the fuel economy is substantially unchanged (due primarily to the selective nature of the enrichment, and the re-leaning of the air-fuel mixture at higher speeds, which is characteristic of the carburetor control of FIG. 2). However, even this reduction or loss in fuel economy is small as compared to that encountered in other emission control systems.

Additional spark retard is commonly used with thermal or catalytic reactors, to obtain rapid warmup and additional reactor temperature, which is said to provide a reduced level of emissions (as compared to that obtained with no additional retard). However, this additional spark retard (if used indiscriminately) carries with it a severe drop in fuel economy, a drop in the car performance or driveability, and an increase in underhood temperatures. It is pointed out that no additional spark retard is utilized in the present system; the standard ignition system is used, retaining the standard advance curve and initial timing. Thus, the disadvantages of additional spark retard can be obviated. Additional spark retard can be used with the present system to afford additional reduction of emissions (at the above described expense, however), and is not excluded from the scope of this invention.

In the past, exhaust gas recirculation has often been employed to reduce the emission of $NO_x$. However, exhaust gas recirculation has a definite and substantial adverse effect on the car performance, or driveability; the car does not respond normally because the mixture in the cylinders has been so diluted with exhaust gas. Also, the control (valving, rerouting, or switching) of hot exhaust gas is extremely difficult because of the particulate matter, gum, acids, etc. in this gas. It is pointed out that in the system of the present invention no exhaust gas recirculation is used, so that the problems associated with such recirculation are avoided. Again, however, if additional $NO_x$ reduction were desired, some exhaust gas recirculation could be used, but only a much lesser amount would be required, so that performance or driveability would not be unduly compromised.

It is again pointed out, however, that spark retard and exhaust gas recirculation both result in an adverse effect on driveability. In contrast, in the emission control system of the present invention (used without these alternative methods) the driveability in terms of acceleration as well as other criteria such as startability, warmup, throttle response, etc. has remained excellent.

As previously described, the selective carburetor enrichment arrangement of FIG. 2 is responsive to engine speed, since ignition pulses are fed at 17 into unit 18. It may be more desirable, in some instances, to base the carburetor control on vehicle speed, rather than on engine speed, such as in the case of a vehicle with an automatic transmission, wherein there is slippage and wherein some fuel economy may be otherwise lost due to that slippage. For vehicle speed, a small pulse generating device of some sort could be placed in the drive line, or in the transmission tail shaft which operates the speedometer, in order to generate pulses (proportional to vehicle speed) for application to the input of unit 18. Mechanical vehicle speed sensing (not employing pulses) could alternatively be used for controlling the selective carburetor enrichment arrangement. For this purpose, it is anticipated that switches of known type (responsive to transmission pressure, or to drive line rpm) could be employed to suitably control the solenoid 22.

The following examples, illustrating the novel automotive emission control system of this invention and the results obtained therewith, are given without any intention that the invention be limited thereto. Except as noted below, the sampling and analysis of emission components were carried out in the prescribed manner according to the Federal test procedure, using the seven-mode cycle. In the absence of regulations, the $NO_x$ were determined by the H.E.W. recommended sampling and subsequent Saltzman determination. Aldehydes, also not prescribed by Federal law, were determined by a method described in the article "Determination of Aldehydes in Automobile Gas," condensed in *SAE Journal*, November, 1967, page 58.

EXAMPLE 1

The automotive vehicle utilized in this example was a 1967 Chevrolet Camaro, a sporty-type, performance-oriented vehicle, with 350-cubic-inch-displacement engine and manual transmission. As originally received, this car had the 1967 California air injection system. A Rochester 2GC carburetor was modified in accordance with this invention to provide an interruption of the power jet vacuum in city (urban) driving. Two thermal reactors, of the type described in the aforementioned patent, were utilized.

Table I, following, gives hot cycle test data obtained with this vehicle.

TABLE I

| | Factory Equipped | Modified Car | % Modified of Factory Equipped |
|---|---|---|---|
| $NO_x$, ppm | 1203 | 354 | 29 |
| CO, % | 1.0 | 0.20 | 20 |
| HC, ppm | 217 | 39 | 18 |
| Aldehydes, ppm | 139 | 48 | 35 |
| Fuel Economy, mpg | | | |
| 30 mph | 22.1 | 19.5 | 88 |
| 50 mph | 18.6 | 18.2 | 98 |
| 60 mph | 15.8 | 15.9 | 100 |

Table II, following, presents data comparing the results obtained for the car of Example 1 with the 1975 National Objectives recently suggested by the Department of Health, Education, and Welfare, in an article by A. C. Stern, *SAE Journal*, Vol. 75, No. 11 (1967), page 69. These are spelled out in terms of percentages of emissions from all pre-1968 vehicles. The percentage levels given for the car of Example 1 are based on conservative estimates of the average emissions of all pre-1968 cars, as follows:

| Hydrocarbons | 600 ppm; |
|---|---|
| CO | 3%; |
| $NO_x$ | 1500 ppm. |

TABLE II

| | 1975 National Objectives (% of all pre-1968 car emissions) | Car of Example 1 (% of all pre-1968 car emissions) |
|---|---|---|
| Nitrogen Oxides | 25 | 24 |
| Carbon Monoxide | 15 | 7 |
| Hydrocarbons | 6 | 6 |

EXAMPLE 2

The automotive vehicle used in this example was a 1969 Ford LTD, a heavy-bodied, medium-small-engine-powered, fully equipped, family sedan with 351-cubic-inch-displacement engine and with automatic transmission, power steering, power brakes, air conditioning, and retractable headlamps. The Autolite No. 2100-2V carburetor was modified in accordance with the principles set forth in FIG. 2, to provide electronic power jet control with filtered vacuum bleed. This particular carburetor utilized the diaphragm-type control arrangement (previously mentioned) for the power jet. Again, two thermal exhaust manifold reactors were utilized, somewhat modified as compared to the aforementioned patent, but using similar principles of operation.

Table III, following, gives composite cold start test data obtained with this vehicle.

TABLE III

| | Factory Equipped | Modified Car | % Modified of Factory Equipped |
|---|---|---|---|
| $NO_x$, ppm | 1350 | 277 | 20 |
| CO, % | 1.73 | 0.46 | 27 |
| HC, ppm | 176 | 59 | 33 |
| Aldehydes, ppm | 98 | 22 | 22 |
| Fuel Economy, mpg | | | |
| 30 mph | 19.7 | 16.8 | 86 |
| 50 mph | 16.5 | 15.8 | 96 |
| 60 mph | 14.6 | 14.1 | 97 |
| City-Suburban Test Route | 15.1 | 13.6 | 90 |

Although the emission control system of the invention has been described as including the thermal exhaust manifold reactors 4 and 4', this is merely the preferred embodiment. It is entirely possible to use, in place of these thermal reactors, catalytic converters of known type, and the use of such latter converters is not outside the scope of the present invention. Catalytic converters, when used in the system of the invention, will function effectively and efficiently in a manner similar to the thermal reactors previously described, which is to say that the former will also convert at least a part of the carbon monoxide and hydrocarbons contained in the combustion chamber effluent to harmless substances.

The use of catalytic converters in the system of the present invention may be quite feasible and practical in view of the fact that one of the main drawbacks, if not the main drawback, to their use (to wit, the poisoning of the catalyst by leaded fuels) will quite probably be removed by the increased availability of non-leaded fuels.

In connection with catalytic converters, it will be appreciated that the procedures of spark retard and of exhaust gas recirculation (both of which were commonly used in the past, in conjunction with catalytic converters, and both of which result in an adverse effect on driveability) are not at all necessary with the system of the present invention, and are ordinarily, and preferably, not utilized in the latter system.

The invention claimed is:

1. An exhaust emission control arrangement for a motor vehicle internal combustion engine using a fossil fuel, comprising a carburetor for feeding a fuel-air mixture to the intake of said engine, enriching means for increasing the fuel-air ratio in said mixture, means for actuating said enriching means at engine or vehicle speeds below a predetermined speed but above idle speed and for terminating the action of said enriching means upon reaching said predetermined speed, and means acting upon the effluent from the combustion chambers of said engine for converting at least a part of the carbon monoxide and hydrocarbons contained in said effluent to harmless substances.

2. Arrangement recited in claim 1, wherein said enriching means includes a power valve incorporated in said carburetor, said valve when operated to open position supplying fuel to the engine intake; and wherein said actuating means causes operation of said valve to open position at engine or vehicle speeds below a predetermined speed but above idle speed.

3. Arrangement recited in claim 1, wherein the last-mentioned means comprises a thermal reactor receptive of and acting upon said effluent.

4. An exhaust emission control arrangement for a motor vehicle internal combustion engine using a fossil fuel, comprising a carburetor for feeding a fuel-air mixture to the intake of said engine, enriching means for increasing the fuel-air ratio in said mixture, and means for actuating said enriching means at engine or vehicle speeds below a predetermined speed but above idle speed and for terminating the action of said enriching means upon reaching said predetermined speed.

5. Arrangement recited in claim 4, wherein said enriching means includes a power valve incorporated in said carburetor, said valve when operated to open position supplying fuel to the engine intake; and wherein said actuating means causes operation of said valve to open position at engine or vehicle speeds below a predetermined speed but above idle speed.

* * * * *